Figures 1, 2:
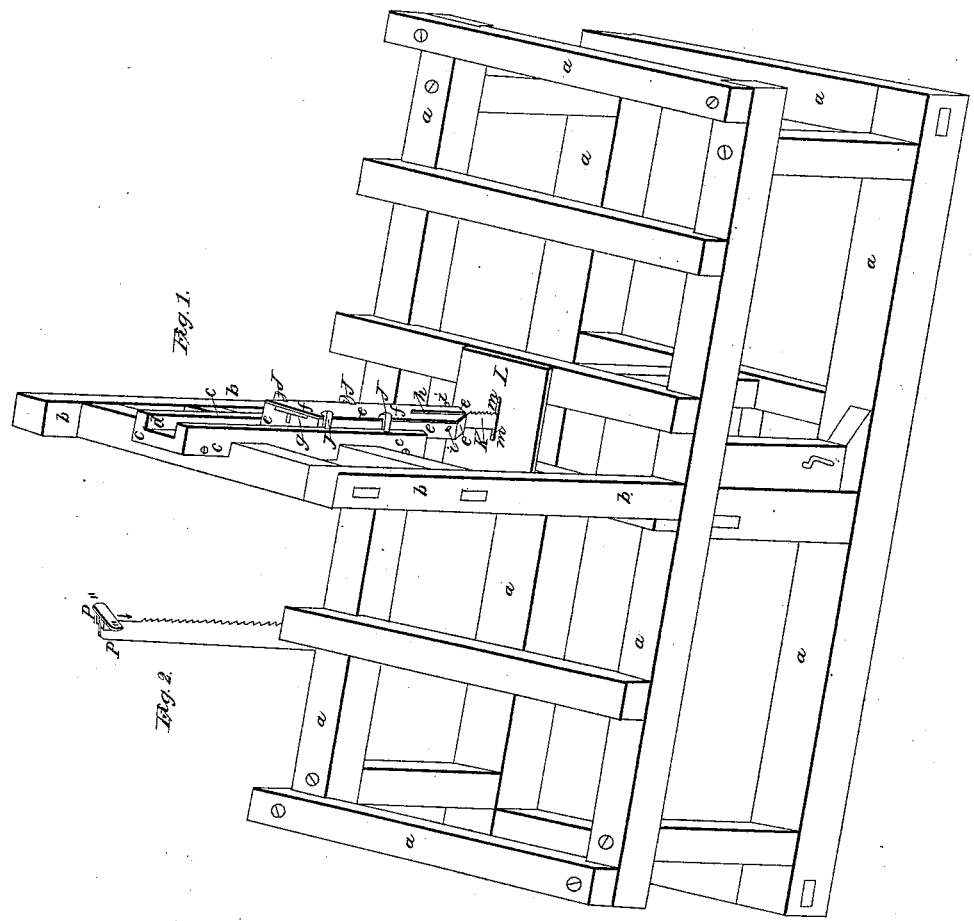

I. N. Forrester,
Reciprocating Saw Mill.
N° 13,716.
Patented Oct. 30, 1855.

UNITED STATES PATENT OFFICE.

I. N. FORRESTER, OF CENTERVILLE, VIRGINIA.

METHOD OF HANGING MULEY-SAWS.

Specification forming part of Letters Patent No. 13,716, dated October 30, 1855; Reissued September 2, 1856, No. 393.

*To all whom it may concern:*

Be it known that I, ISAAC N. FORRESTER, of Centerville, in the county of Fairfax and State of Virginia, have invented and made certain new and useful Improvements in the Manner or Mode of Hanging or Arranging Muley-Saws for Sawmills, which improvements I term the "Self-ranging saw;" and I do hereby declare that the following is a full, clear, and exact description of the same, reference being had to the accompanying drawings, making a part of this specification, in which—

Figure 1, is a perspective view or sketch of the framing of a saw mill and posts, $a, a, a, a, a, a, a, a, a, b, b, b, b, c, c, c, c$, the way; $d$, the adjusting slide groove; $e, e, e, e, e$, the guide block, with saw, or play groove $g, g$. $f, f$, is cap to groove. $h$, is slot for oiling slides of saw. $i, i$ are tightening pins. $J, J, J, J$, are clamp, or key staples. $K$ is the saw; $L$, the saw table. $m, m$, is the kerf, or guide slot.

Fig. 2 shows the saw with the ears or range flanges $n, n$, attached to the saw by side pieces or blocks P, P.

Deeming it unnecessary to describe in full, the construction, or details of saw mills, and as I do not comprehend herein any claim to improvements in the general construction of saws, I will therefore confine myself to describing the principle of my improvements, and the object attained thereby.

It is a well known fact that in the very numerous improvements in saw mills, and in the various alleged improved modes of hanging saws, the aim has been to so arrange the saw in the hanging or straining thereof, that in the cutting or sawing of the log or timber, the saw should not leave the log or cut with irregularity, or deflect from the palallel position relative to the log, or to the sides of the carriage, whereby the kerf or track of the saw, would not be out of a direct line. These defects, and difficulties in hanging saws, have been more or less consequent upon the application of the various modes resorted to heretofore, and consequently the operation of sawing has been attended with much defective timber, and considerable loss.

My experience and close observation in the construction and erection of saw mills have enabled me to proceed with numerous experiments, and the result of my experiments has been attended with complete success, in discovering the desired method of hanging saws, so as to accomplish the desired purpose I have tested and proved the fact, that the undue strain or rigidity of the blades of saws, throughout their surfaces, has been the sole cause of the very great difficulties mentioned herein. In all other modes than mine, the ends of the saw have been strained by clamp, or lateral pieces, or by bolts, or rivets, affording rigidity to the blade of the saw, or giving a stiffness to the back edge, as well as to the front or teeth part. Now the tendency of this clamping or stiffening of the ends of the saw, is to make the blade part, stiff to a very great extent, and it not infrequently occurs that in commencing on the side of a log or piece of timber, the said blade generally tends to deflect outward owing to the action against the blade, of the smaller detached part or board. This is owing to the fact that the smallest detached part vibrates or plays more than the larger part, or more bulky portion, and acting frequently against the rigid blade, causes it to tend outward from the log.

It has been found, that especially where the saw blade is rigidly hung, and when the teeth encounter knotty or tough portions of the timber, and when the friction or abrasion of the saw blade causes it to become heated, and induced to twist or wind out of true, that the cut or kerf is made rough and irregular, owing to binding of portions of the blade. In such instances it is impossible to saw smooth and even lumber; for every inequality of the cut, as well as the twist or bends of the blade tend more and more to direct the teeth of the saw, just as is the case in the pressure of the water on a vessels rudder, or as the curved lateral movements of a fish's tail gives direction to the head. And again wherever there is a bend of the blade no matter how small, this irregular surface tends to act upon the direction of the teeth of the saw. Such difficulties can not occur in my mode of hanging saws, for I do not strain the ends thereof nor stiffen the surface of the blade.

The nature and principle of my improvements consist in arranging muley saws, in the following manner, viz: I take an ordinary mill saw blade, and attach to one end thereof, on the front or teeth edge and at right angles to the edge, flanges or ear guides *n, n*, Fig. 2, riveted or attached to the saw blade by blocks P, P. The ears are attached so as to allow the point or line of connection to be in a vertical line with the base of the teeth as indicated by the arrow. The lower end of the saw blade may be hung in the same way, or merely a hole punched, in a line with the base of the teeth, and by this hole attached to the end of a pitman rod. Now by this means the back edge, and all the blade part of the saw is free from rigidity, or stiffness. The saw is then arranged by its ears, or flanges *n, n*, Fig. 2, within the saw or play groove *g, g*, formed in guide block *e, e, e, e*, and the saw is held in place by the groove cap *f, f*, and tightening plugs or wedges or pins *i, i*, are inserted in the guide block *e, e, e, e, e, e*. It will be perceived that the saw blade has no strain or tension at all, and hence the operation or action of the saw is as follows, viz: When the log or timber to be sawed is adjusted upon the mill carriage, and is fed up aganst the teeth, and if set parallel with the log, or sides of the carriage, they will enter the log in a direct line, and the cut will be direct, and if the teeth encounter any knotty or tough portions of the timber, they will cut nevertheless in a direct line, for they are not held rigid or controlled by the back edge of the blade, but instead are directed or influenced solely by the ears, or flanges *n, n*, Fig. 2. Owing to the freedom, of the flexible property of the blade, backward, from the base of the teeth, the rigidity of metal is overcome, and is not communicated to the teeth, in the action of any inequality of movement or vibratory action of the smaller detached part of timber, for, the back edge can give and yet not deflect the teeth of the saw from their direct course. By doing away with the general rigidity or stiffness of the blade, the teeth of the saw guide themselves, while the back edge must be influenced by them, and conform to the movement of the teeth, consequently there is but little if any liability of a saw blade arranged in my way, to become heated, twisted, or misshapen and consequently useless.

By my mode of working saws, there is great precision of cut, with expedition of working. Besides too, saws hung in my manner will work a much longer time without being reset, or sharpened and will cut or saw up an ordinary size log, or five or six hundred feet of lumber, without requiring the repeated attention and adjusting found attending the operation of all other saws. One man can readily superintend the working of three or four saws with certainty of operation and greatly improved results.

Having described my improved mode of hanging or arranging saws, and having shown the very marked, and important distinguishing features between my mode and all others known to myself,

What I claim as new and original, and desire to have secured by Letters Patent of the United States, is—

The manner or mode of hanging sawblades by forming thereon, or attaching to the front edge only of one or both ends, devices, which I term saw, or guide flanges *n, n*, Fig 2, and the working or applying the same in grooves or guide places *g, g*, whereby the back edge and principal part of the saw blade is free, and unstrained, and without any rigidity or stiffness, other than that of the blade itself, substantially as set forth and for the purpose specified.

I. N. FORRESTER. [L. S.]

Witnesses:
 John S. Hollingshead,
 E. G. Handy.

[First printed 1912.]